Sept. 29, 1959 K. GOLDSMITH 2,905,946
HAND PROTECTORS
Filed Feb. 4, 1958 2 Sheets-Sheet 1
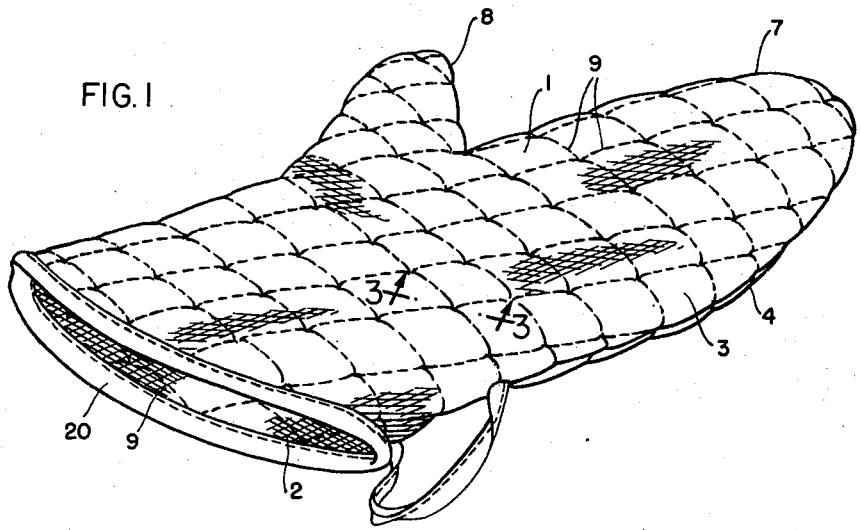
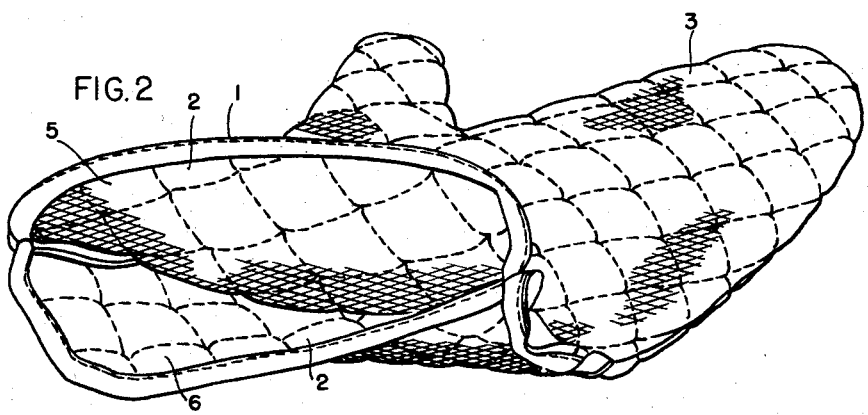
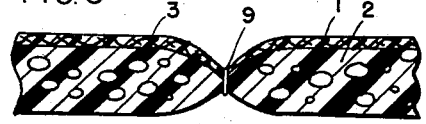 
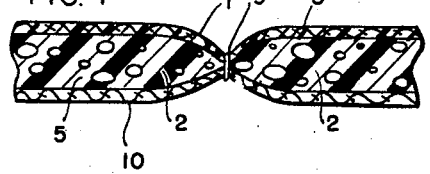 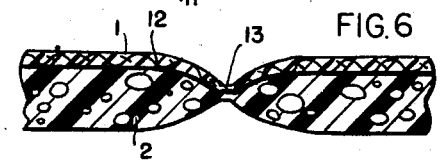
INVENTOR:
KURT GOLDSMITH
BY
*Margall, Johnston, Cook + Root,*
ATT'YS Sept. 29, 1959 K. GOLDSMITH 2,905,946
HAND PROTECTORS
Filed Feb. 4, 1958 2 Sheets-Sheet 2
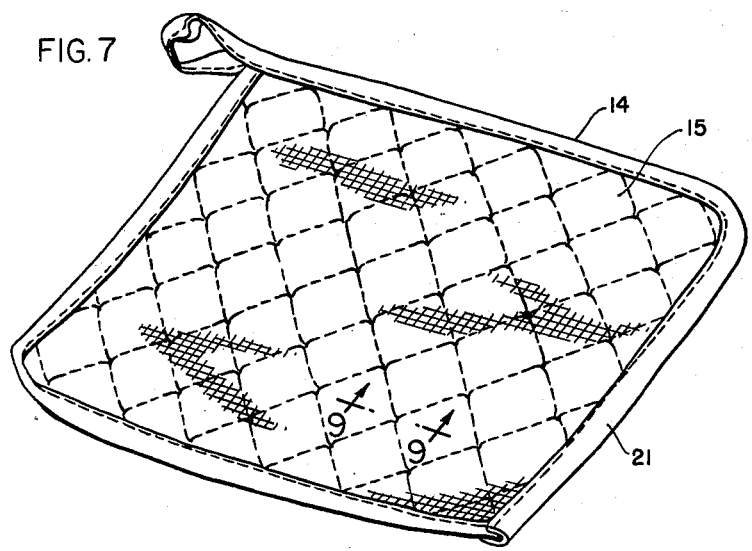
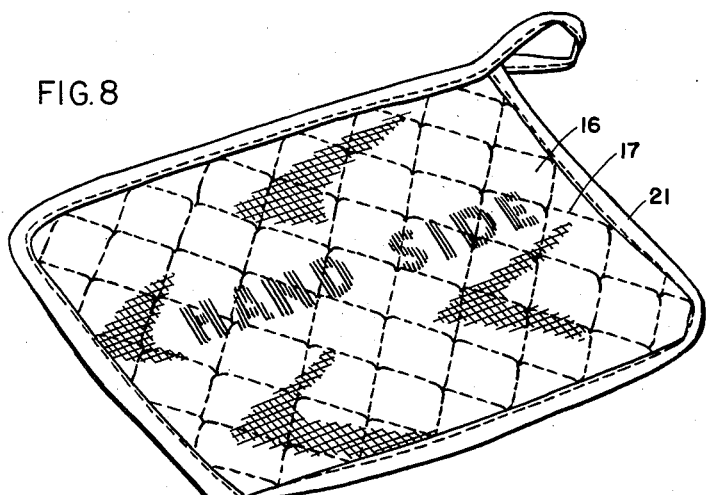
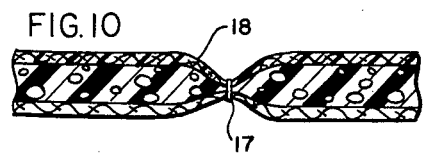
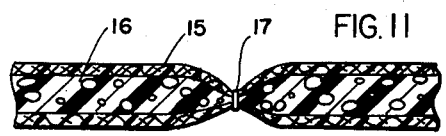
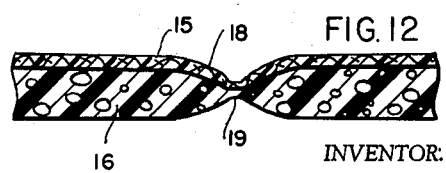
INVENTOR:
KURT GOLDSMITH
BY
Marzall, Johnston, Cook & Root,
ATT'YS United States Patent Office 2,905,946
Patented Sept. 29, 1959

2,905,946

HAND PROTECTORS

Kurt Goldsmith, Glencoe, Ill., assignor to Textile Mills Company, Chicago, Ill., a corporation of Illinois Application February 4, 1958, Serial No. 713,168

9 Claims. (Cl. 2—158)

This invention relates to hand protectors, and particularly to items or articles known generally as pot holders and barbecue mitts.

The invention comprises in general a hand protector article, such as a barbecue mitt or a pot holder, wherein there is provided on one side of the article a sheet of cloth material, such as cotton, or the like, impregnated with a thermosetting plastic or resinous material containing a certain amount of fine metal particles, particularly aluminum powder. The cloth material is relatively porous, and a thermosetting plastic or resinous product containing aluminum powder is dispersed in the plastic or resinous material and is applied to the cloth material by a knife blade spreading process, or otherwise, so as to make the cloth material heat resistant in view of the resinous compound used by reducing radiant heat, as well as eliminating a certain amount of reflective heat by virtue of the aluminum powder. The metal powder dispersed within the plastic or resinous material, while still leaving the cloth flexible, includes inherent heat resisting properties. This impregnated cloth preferably comprises the outer layer of the hand protector, while an inner layer is arranged on the inside of the mitt or the other side of the pot holder, in cases where the pot holder is just a flat article. The liner or second layer comprises a foam polymer, either natural or synthetic, and includes natural rubber as well as synthetic rubber. In each instance, however, the polymer is foam and has a certain predetermined amount of heat resistance, particularly by reason of lessening radiant heat.

The primary object of the present invention resides in the provision of a hand protector in the nature of a pot holder or barbecue mitt having waterproof surface on one side, coated with a plastic material containing metallic powder whereby a heat resistant, easily washable surface is provided, and reflective heat is deflected, there being a washable material against the first sheet comprising a foam polymer, such as polyester to dissipate radiant heat.

A further object of the invention resides in the provision of a hand protector in the nature of a barbecue mitt or pot holder whereby a washable, heat resistant material is arranged on the article removed from the hand, while the hand engaging surface of the material comprises a washable heat resisting foam polymer.

A still further object resides in the provision of a hand protector, such as a mitt or pot holder, comprising layers of material, one layer being a cloth fabric impregnated with a plastic, such as resin, and containing metal powder, such as aluminum powder.

Numerous other objects and advantages will be apparent throughout the progress of the specification which follows.

The accompanying drawings illustrate certain selected embodiments of the invention, and the views therein are as follows:

Fig. 1 is a detail elevational view of a barbecue mitt embodying the invention;

Fig. 2 is a view similar to Fig. 1 but showing the hand receiving opening turned over to show part of the interior thereof;

Fig. 3 is a detail enlarged transverse sectional view on the line 3—3 of Fig. 1;

Fig. 4 is a view similar to Fig. 3 but showing an inner lining of ordinary cotton material;

Fig. 5 is a view similar to Figs. 3 and 4 but showing heat resistant resinous or plastic material arranged on both the inside and outside of the mitt;

Fig. 6 is a view similar to Figs. 3 to 5 but showing the outer heat reflecting material laminated to the inner foamed polyester by means of an adhesive material, the sheets being embossed instead of stitched;

Fig. 7 is an inside plan view showing the pot or utensil engaging side of a pot holder;

Fig. 8 is a plan view of the reverse or hand engaging side of the pot holder;

Fig. 9 is an enlarged detail transverse sectional view on the line 9—9 of Fig. 7;

Fig. 10 is a view similar to Fig. 9 but having an additional layer of cotton fabric arranged on the hand side of the pot holder;

Fig. 11 is a view similar to Figs. 9 and 10 but showing the resinous impregnated heat reflecting material arranged on both sides of the pot holder with the polyester therebetween; and Fig. 12 is a view similar to Figs. 9 and 11 but showing the outer heat reflecting material laminated to the inner foam polyester by means of an adhesive material, the sheets being embossed instead of stitched.

The particular construction herein shown for the purpose of illustrating the invention comprises a barbecue mitt, Figs. 1 to 6, which includes an outer sheet 1 to which there is applied an inner sheet 2, thus making a two-ply construction. The outer sheet 1 comprises an outer surface 3 which is the palm side of the mitt, and a rear or back sheet 4 which is arranged at the back hand side of the mitt. The inner sheet 2 includes a layer or sheet 5 which is arranged within the mitt at the hand side, and a second sheet 6 of the same material arranged at the back hand side of the mitt.

The outer sheet 1, which is disclosed as comprising the two separate parts 3 and 4, is made of a cloth material such as woven cotton fabric to which there is applied a silicone plastic of a resinous nature containing powdered metal, such as powdered aluminum. The plastic or resinous material is applied to the cotton fabric by means of a knife edge so as to impregnate thoroughly the plastic material and fill all the interstices of the fabric. The resinous, or plastic, material is of such a kind and nature to have heat dissipating and heat resisting qualities to dissipate or retard radiant heat, and to make the cloth material waterproof. Also, the powdered aluminum dispersed in the thermosetting plastic material provides for heat reflection, therefore causing a great deal of heat to be dissipated and not be transmitted interiorly. Therefore, the outer sheet 1, which comprises the two outer surfaces 3 and 4, is heat resistant to a considerable extent, the sheet 1 being made in the two parts 3 and 4 for ease in manufacture and for economical reasons. The silicone in the resinous material is somewhat heat resistant and water repellent.

The hand protector mitt is of the usual conventional shape in that it comprises the main part 7 to contain the four fingers and the thumb piece 8. The mitt is so constructed as to be capable of use on either hand.

The inside part 2, which comprises the two inner sections or layers 5 and 6, is made from foamed polymer and includes both natural and synthetic polymer, as well as either foamed natural or synthetic rubber. Preferably, the inner sheet 2, comprising the opposed two inner surfaces 5 and 6, is made of a foamed polyester. The polyester material dispels a considerable amount of radiant heat, and overcomes or dispels a considerable amount of heat.

The mitt, shown in Figs. 1 and 2, comprises a front or palm side, which is made of two layers, and a rear or back side which is also made of two layers. The outer layer in each instance is made of thermosetting plastic material in which aluminum powder is dispersed. The inner part of the glove, comprising the surfaces 5 and 6, is made of foamed polyester. The palm side 3 of the sheet 1 is secured to the palm side 5 of the inner sheet 2 by means of stitching 9, the back of the sheet 1 being secured to the back hand side 6 of the sheet 2 in the same manner.

The inner surfaces of the glove, being made of the foamed polyester, provide for a good grip so that the hand will not slip in the mitt while the mitt is being used to handle a hot spit or other utensil used in connection with a barbecue.

If desirable, however, a layer of cotton or other fabric may be arranged inwardly of the polyester, as indicated at 10, Fig. 4. In this latter case the parts are secured together by the same stitching 9.

A disadvantage, however, in having the inside of the glove lined wtih the cotton fabric 10 is that the cotton fabric is likely to become soiled during usage of the mitt, but without this interlining 10, it is an easy matter to clean the inside of the glove by turning it inside out and washing it. The outside of the glove, of course, containing a resinous material, is also easily washable as well as being heat resistant.

As shown in Fig. 5, a different interliner sheet 11 may be used instead of the cotton interliner fabric 10. This interliner 11 may be made of the same kind of material as the outer sheet 1 which comprises the opposed surfaces 3 and 4. The three layer construction shown in Fig. 5 may be stitched together, as indicated at 9, in the usual quilted fashion. However, it has been found that the stitching 9 may cause interstices completely through the outer sheet 1 and through the inner polyester sheet 2, and, therefore, water on the outside of the mitt may penetrate inwardly, also, water or dampness on the inside of the mitt may penetrate outwardly. Therefore, it is desirable that no stitching be used, but instead a lamination in the form of an embossment may be provided. This lamination consists in securing the outer sheet 1 to the inner sheet 2 by laminating the two parts together by using an adhesive 12, and then embossing the laminated sheets, as indicated at 13 such as by applying pressure along predetermined lines. Particular designs may be had on the glove to enhance the ornamental appearance thereof, to prevent heat penetrating through interstices caused by stitching, as the stitching has been omitted, and to render the mitt not only heat resistant but also water dispelling.

The construction disclosed in Figs. 7 to 12, inclusive, substantially embodies the same arrangement disclosed in Figs. 1 to 6 except the construction shown in Figs. 7 to 12, inclusive, relates to a pot holder instead of a mitt.

The pot holder 14, Figs. 7 to 12, inclusive, comprises an inner sheet 15 which is made of cotton or other suitable fabric impregnated by a plastic or resinous material containing metal powder, such as aluminum, in the same manner in which the outer layer 1 of the mitt is made. The side 15 of the pot holder 14 is the inside, or that part of the holder which comes in contact with the handle or other part of the pot or other utensil. The other side 16 of the pot holder is made of the aforementioned foam polyester, and is used for the same purpose as described with respect to the mitt. The foam polymer side 16 is really the outside which is engaged by the hand of the user, and thus prevents slipping of the person's hand on the pot holder. The sheets or parts of the pot holder 14 are adapted to be stitched together, as indicated at 17, similar to the stitching 9 previously described with respect to Figs. 1 to 7.

The pot holder 14 like the mitt may have an outer layer of cotton or other fabric 18 applied exteriorly thereof. However, there may be somewhat of a disadvantage in having the cotton material applied on the hand gripping side of the pot holder, in that it is not as easily washable as if the cotton fabric were omitted. However, by applying a sheet of the material 15 over the foam polyester 16, the material becomes more insulating and both sides are washable.

The use of the stitching 17, however, may be considered somewhat detrimental in that it does not exclude all the heat because some of the heat may pass through the holes formed by the needles during the stitching operation. Also, during washing, water may pass through the interstices caused by the stitching. This may be overcome in the same manner as previously described with respect to Fig. 6, and as shown in Fig. 12, wherein the sheet 15 may be adhered to the polyester sheet 16 by means of an adhesive material 18 laminating the sheets 15 and 16 together. The sheets may be laminated and embossed, as indicated at 19, Fig. 12.

The invention provides for a heat resistant hand protector, such as a mitt or pot holder, which can be easily washed and cleaned, which reflects heat from one side, and which dispels a great amount of radiant heat by convection, or otherwise. The devices of the invention may be readily and economically made, and embody certain safety features, such as the prevention of hand slippage, as well as permitting the articles to be easily cleaned by wiping with a damp cloth or by washing the same.

The side edges of the mitt may be merely sewn together, or they may be taped, or merely the cuff end of the mitt may be taped as indicated at 20, Fig. 1, or completely bound about the pot holder as indicated at 21, Figs. 7 and 8. If binding material 20 and 21 is to be used, it is preferable that it not be a conventional cotton tape, but be of a material like the outer sheets 1 and 15.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A hand protector comprising a first hand engaging surface for engagement with the hand by the user and a second surface for engagement with an utensil or part thereof, said first hand engaging surface comprising a foam polyester, said second engaging surface comprising an impregnated fabric secured to the first engaging surface, said second engaging surface including a thermosetting plastic material which is heat retardant and which contains silicone and powdered aluminum to act as a heat resisting and reflecting surface, said fabric and foam polyester being secured together by stitching operations in quilted fashion.

2. A hand protector comprising a first hand engaging surface for engagement with the hand by the user and a second surface for engagement with an utensil or part thereof, said first hand engaging surface comprising a foam polyester, said second engaging surface comprising an impregnated fabric secured to the first engaging surface, said second engaging surface including a thermosetting plastic material which is heat retardant and which contains silicone and powdered aluminum to act as a heat resisting and reflecting surface, said fabric and foam polyester being secured together, there being a binding material securing said first and second surfaces together, and means embossing said surfaces to assist said surfaces being secured together and to form an ornamental configuration on at least one side of said surfaces.

3. A barbecue mitt comprising outer material of fabric having a palm side and a back hand side, said fabric being impregnated with a thermosetting resinous silicone in which powdered aluminum is dispersed, inner material within the mitt and comprising a foam polyester, said inner and outer material being secured together.

4. A barbecue mitt comprising outer material of fabric having a palm side and a back hand side, said fabric being impregnated with a thermosetting resinous silicone in which powdered aluminum is dispersed, inner material within the mitt and comprising a foam polyester, said inner and outer material being secured together by a stitching operation in quilted fashion.

5. A barbecue mitt comprising outer material of fabric having a palm side and a back hand side, said fabric being impregnated with a thermosetting resinous silicone in which powdered aluminum is dispersed, inner material within the mitt and comprising a foam polyester, said inner and outer material being secured together by laminating the inner and outer material and by embossing.

6. A pot holder comprising a pair of opposed sheets, one sheet being the hand engaging side of the holder and formed of a foam polymer, the other sheet being the utensil engaging side of the holder formed of a fabric material impregnated with a thermosetting silicone resinous material containing powdered aluminum, said foam polymer having heat resisting qualities and easily washable, the resinous impregnated sheet embodying the resinous material for heat retarding purposes, the silicone for water resisting purposes and the powdered aluminum for heat deflecting purposes, and means to secure said sheets together.

7. A pot holder comprising a pair of opposed sheets, one sheet being the hand engaging side of the holder and formed of a foam polymer, the other sheet being the utensil engaging side of the holder formed of a fabric material impregnated with a thermosetting silicone resinous material containing powdered aluminum, said foam polymer having heat resisting qualities and easily washable, the resinous impregnated sheet embodying the resinous material for heat retarding purposes, the silicone for water resisting purposes and the powdered aluminum for heat deflecting purposes, and means to bind said sheets together, said means to secure said sheets together being lamination and embossing.

8. A hand protector comprising a hand engaging surface for engagement with the hand by the user and an utensil engaging surface for engagement with an utensil or part thereof, said hand engaging surface comprising a sheet of cotton fabric, said utensil engaging surface comprising a sheet of fabric impregnated with a thermosetting resinous silicone in which powdered aluminum is dispersed, and a sheet of material comprising a foam polyester arranged between said sheets of fabrics, and means for securing all of said sheets together.

9. A hand protector comprising a hand engaging surface for engagement with the hand by the user and an utensil engaging surface for engagement with an utensil or part thereof, both said hand and utensil engaging surfaces comprising sheets of fabric impregnated with a thermosetting resinous silicone in which powdered aluminum is dispersed, and a sheet of material comprising a foam polyester arranged between said sheets of fabric, and means for securing all of said sheets together.

References Cited in the file of this patent

UNITED STATES PATENTS

| | | |
|---|---|---|
| 2,474,273 | Olson | June 28, 1949 |
| 2,630,620 | Rand | Mar. 10, 1953 |
| 2,703,887 | Kennedy | Mar. 15, 1955 |
| 2,774,077 | Pressler et al. | Dec. 18, 1956 |
| 2,810,131 | Kogut | Oct. 22, 1957 |
| 2,841,205 | Bird | July 1, 1958 |